(12) United States Patent
Ohzono et al.

(10) Patent No.: US 8,205,699 B2
(45) Date of Patent: Jun. 26, 2012

(54) AUTOMOTIVE VEHICLE HAVING ENGINE AIR GUIDE PASSAGE

(75) Inventors: Miyuki Ohzono, Saitama (JP); Kenji Koga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 12/521,996

(22) PCT Filed: Jul. 25, 2008

(86) PCT No.: PCT/JP2008/063422
§ 371 (c)(1),
(2), (4) Date: Jul. 2, 2009

(87) PCT Pub. No.: WO2009/019996
PCT Pub. Date: Feb. 12, 2009

(65) Prior Publication Data
US 2010/0140004 A1    Jun. 10, 2010

(30) Foreign Application Priority Data
Aug. 9, 2007  (JP) .............................. P. 2007-208219

(51) Int. Cl.
*B60K 13/02* (2006.01)
(52) U.S. Cl. ...................................... 180/68.3; 180/69.2
(58) Field of Classification Search ................ 180/68.1, 180/68.2, 68.3, 69.2, 69.22, 69.25
See application file for complete search history.

(56) References Cited

U.S. PATENT DOCUMENTS

| | | | |
|---|---|---|---|
| 2,701,024 A | | 2/1955 | Thomas |
| 3,800,910 A | * | 4/1974 | Rose ............... 181/229 |
| 4,646,864 A | * | 3/1987 | Racchi ............ 180/69.22 |
| 4,778,029 A | * | 10/1988 | Thornburgh ....... 181/229 |
| 5,660,243 A | * | 8/1997 | Anzalone et al. .... 180/68.1 |
| 6,056,075 A | * | 5/2000 | Kargilis ............. 180/68.1 |

FOREIGN PATENT DOCUMENTS

| | | |
|---|---|---|
| DE | 40 06 208 A1 | 8/1991 |
| JP | 50-10914 A | 2/1975 |
| JP | 61-134432 U | 8/1986 |
| JP | 4-9329 U | 1/1992 |
| JP | 6-255538 A | 9/1994 |
| JP | 11-294279 A | 10/1999 |
| JP | 2005-029028 A | 2/2005 |

* cited by examiner

*Primary Examiner* — John Walters
(74) *Attorney, Agent, or Firm* — Arent Fox LLP

(57) ABSTRACT

In an automotive vehicle in which an air duct which forms an air guide passage for guiding air that has flowed into an engine compartment to an induction system of an internal combustion engine is provided integrally on an inner surface of a bonnet, a reduction in size and weight of the air duct and a compact disposition of the air duct within the engine compartment are attempted to be realized.

An automotive vehicle includes an internal combustion engine 20 which is disposed within an engine compartment and an air duct 40 which is provided integrally on an inner surface of a bonnet 10. The air duct 40 forms an air guide passage 60 for guiding air that has flowed into the engine compartment to an induction system 20i of the internal combustion engine 20 between itself and a bonnet portion 30 which constitutes part of the bonnet 10 in cooperation with the bonnet portion 30. Because of this, the air duct 40 is a duct having an open section in which an edge portion 44 which is brought into abutment with the bonnet portion 30 in such a state that the air duct 40 is attached in place forms an opening along the air guide passage 60.

7 Claims, 5 Drawing Sheets

AUTOMOTIVE VEHICLE HAVING ENGINE AIR GUIDE PASSAGE

CROSS-REFERENCE TO RELATED APPLICATION

This application is a National Stage entry of International Application No. PCT/JP2008/063422, filed Jul. 25, 2008, which claims priority to Japanese Application No. 2007-208219, filed Aug. 9, 2007, the disclosure of the prior application is incorporated in its entirety by reference.

TECHNICAL

The present invention relates to an automotive vehicle in which an engine is disposed within an engine compartment which is covered with a bonnet and more particularly to an automotive vehicle in which a passage forming component (for example, an air duct) which forms an engine air guide passage for guiding air flowed into the engine compartment to an induction system of the engine is provided integrally on the bonnet.

BACKGROUND ART

There is known an automotive vehicle which includes an engine disposed within an engine compartment which is covered with a bonnet and an air duct which is attached integrally to an inner surface of the bonnet, wherein the air duct forms an air guide passage which guides air that has flowed into the engine compartment to an induction system of the engine (refer to Patent Document No. 1).

Paten Document No. 1: Japanese Patent Unexamined Publication JP-A-11-294279

DISCLOSURE OF THE INVENTION

Problem that the Invention is to Solve

When the air guide passage for guiding air in the engine compartment to the induction system is made up solely of the air duct attached to the bonnet which is a hood material for covering the engine, a duct wall of the air duct which lies closer to the bonnet is interposed between the air guide passage and the bonnet, and in some case, a space that is not used is formed between the duct wall and the bonnet. Thus, from the viewpoint of disposing the air duct which is integral with the bonnet in a compact fashion within the engine compartment, there still remains room for improvement. In addition, the attempt to reduce the weight of the air duct has been restricted by the necessity of ensuring the rigidity of the air duct in order to reduce the vibration of the duct which is caused by a change in air flow due to pulsation of air induced into the air induction system.

In addition, in order to ensure the required rigidity of the bonnet, the bonnet has on an inner surface thereof an irregular construction in which a plurality of recessed portions are provided on a rising portion. When the air guide passage is made solely of the air duct, however, since space formed by the recessed portions is not involved in the air guide passage, the space remains unused effectively. This fact disturbs the compact disposition of the air duct and also calls for enlargement of the air duct to form an air guide passage having a required passage area.

In addition, when an attempt is made to reduce the volume of the engine compartment, there will be stronger demands for smaller and lighter air ducts and more compact disposition of such air ducts.

The invention has been made in view of the above situations, in a vehicle having a passage forming component for forming an engine air guide passage for guiding air flowed into an engine compartment to an induction system of an engine is provided integrally on an inner surface of a bonnet, the present inventions set forth under (1) to (5) aim to make smaller in size and lighter in weight of the passage forming compartment and also enable a compact disposition of the passage forming component with the engine compartment. In addition, the invention set forth under (2) is also intended to realize the reduction in size and weight of the passage forming component and the compact disposition thereof by make use of a recessed portion provided on the bonnet.

Furthermore, the invention set forth under (3) is intended to increase the degree of freedom in disposing an air duct which forms the air guide passage in cooperation with the recessed portion on the bonnet while facilitating the setting of an air flow direction within the air guide passage and also to realize the reduction in size and weight of the air duct which is the passage forming component and the compact disposition thereof.

The invention set forth under (4) is also intended to suppress the vibration of the passage forming component or the air duct by making use of the bonnet and also to realize the reduction in weight thereof.

The invention set forth under (5) is intended to increase the guiding efficiency of air to the induction system by providing a velocity increasing portion in the air guide passage.

Means for Solving the Problem

The objects of the invention are attained by the following configurations.

(1) An automotive vehicle including: an engine disposed within an engine compartment covered with a bonnet and a passage forming component provided integrally on an inner surface of the bonnet, wherein the passage forming component forms an engine air guide passage which guides air flowing into the engine compartment to an induction system of the engine, and the passage forming component forms the air guide passage between a bonnet portion which constitutes part of the bonnet and itself using the bonnet portion as a passage wall of the air guide passage.

(2) The automotive vehicle as set forth in (1), wherein
the bonnet portion has a recessed portion provided on the inner surface of the bonnet so as to be recessed towards an outer surface of the bonnet.

(3) The automotive vehicle as set forth in (2), wherein
the passage forming component is an air duct which is attached to the bonnet and of which edge portion abutting with the bonnet portion forms an opening along the air guide passage, and the air duct is disposed within the recessed portion.

(4) The automotive vehicle as set forth in any of (1) to (3), wherein
the passage forming component forms an outlet port of the air guide passage in a position which opposes to the bonnet portion across the air guide passage, and the bonnet portion deflects the flow of air within the air guide passage towards the outlet port.

(5) and (6) The automotive vehicle as set forth in any of (1) to (4), wherein
the passage forming component has a curved portion which is curved in a direction in which it approaches an air inlet port of the induction system as the passage forming component extends towards a downstream side, the bonnet portion has a rising portion which rises towards the curved portion, the air guide passage has a velocity increasing portion which is formed so as to be held between the curved portion and the rising portion, and an area of the air guide passage at the velocity increasing portion is reduced so as to increase the velocity of air which is deflected by the rising portion to flow along the curved portion.

Advantage of the Invention

According to the aspect of (1), since the bonnet makes up the passage wall which forms the air guide passage together with the passage forming component, the air guide passage is formed by the cooperation of the passage forming component with the bonnet. Consequently, compared with the case where the air guide passage is formed solely by the passage forming component, the passage forming component is made smaller in size and lighter in weight by such an extent that part of the passage wall of the air guide passage is made up of the bonnet. Furthermore, the passage forming component which is provided integrally on the bonnet can be disposed in a compact fashion with the engine compartment.

According to the aspect of (2), since the space defined by the recessed portion provided on the inner surface of the bonnet constitutes the air guide passage, the required passage area of the air guide passage can be ensured further by such an extent that the space constitutes the air guide passage, while making the passage forming component smaller in size. As a result, by making use of the recessed portion provided on the bonnet, the passage forming component can be made smaller in size and lighter in weight, and the disposition thereof is made compact.

According to the aspect of (3), since the air duct having the opening along the air guide passage or a so-called open section is used as the duct which forms the air guide passage, the setting of an air flow within the air guide passage is facilitated, and the degree of freedom in disposing the air duct which forms the air guide passage in cooperation with the recessed portion on the bonnet is increased. Moreover, since the air duct is disposed in the recessed portion, it becomes possible to enable the reduction in size and weight of the air duct mounted integrally on the bonnet and the compact disposition of the air duct within the engine compartment.

According to the aspect of (4), since the portion where air is made to collide to be deflected towards the outlet of air within the air guide passage constitutes the highly rigid bonnet portion which is part of the bonnet, vibration generated by a change in air pressure within the air guide passage which is attributed to pulsation of air induced into the induction system can be reduced without increasing the rigidity of the air duct. As a result of this, since the deflecting portion for deflecting the flow of air is configured by making use of the bonnet, the vibration of the passage forming component or the air duct can be suppressed and the weight of the air duct can be reduced.

According to the aspect of (5), since the flow velocity of air is increased along the curved portion which is curved in the direction in which it approaches the air inlet port of the induction system by the rising portion which rises towards the curved portion in the velocity increasing portion formed by the curved portion and the rising portion in the air guide passage, the guiding efficiency of air to the induction system by the air guide passage is increased.

DESCRIPTION OF REFERENCE NUMERALS

2 engine compartment; 10 bonnet; 14, 15 recessed portion; 20 internal combustion engine; 20i induction system; 22 air cleaner; 22b air inlet port; 30 bonnet portion; 31 deflecting portion; 40 air duct; 60 air guide passage; 61 inlet; 62 outlet; 63 velocity increasing portion.

BEST MODE FOR CARRYING OUT THE INVENTION

Hereinafter, an embodiment of the invention will be described by reference to FIGS. 1 to 6.

Figure 1:
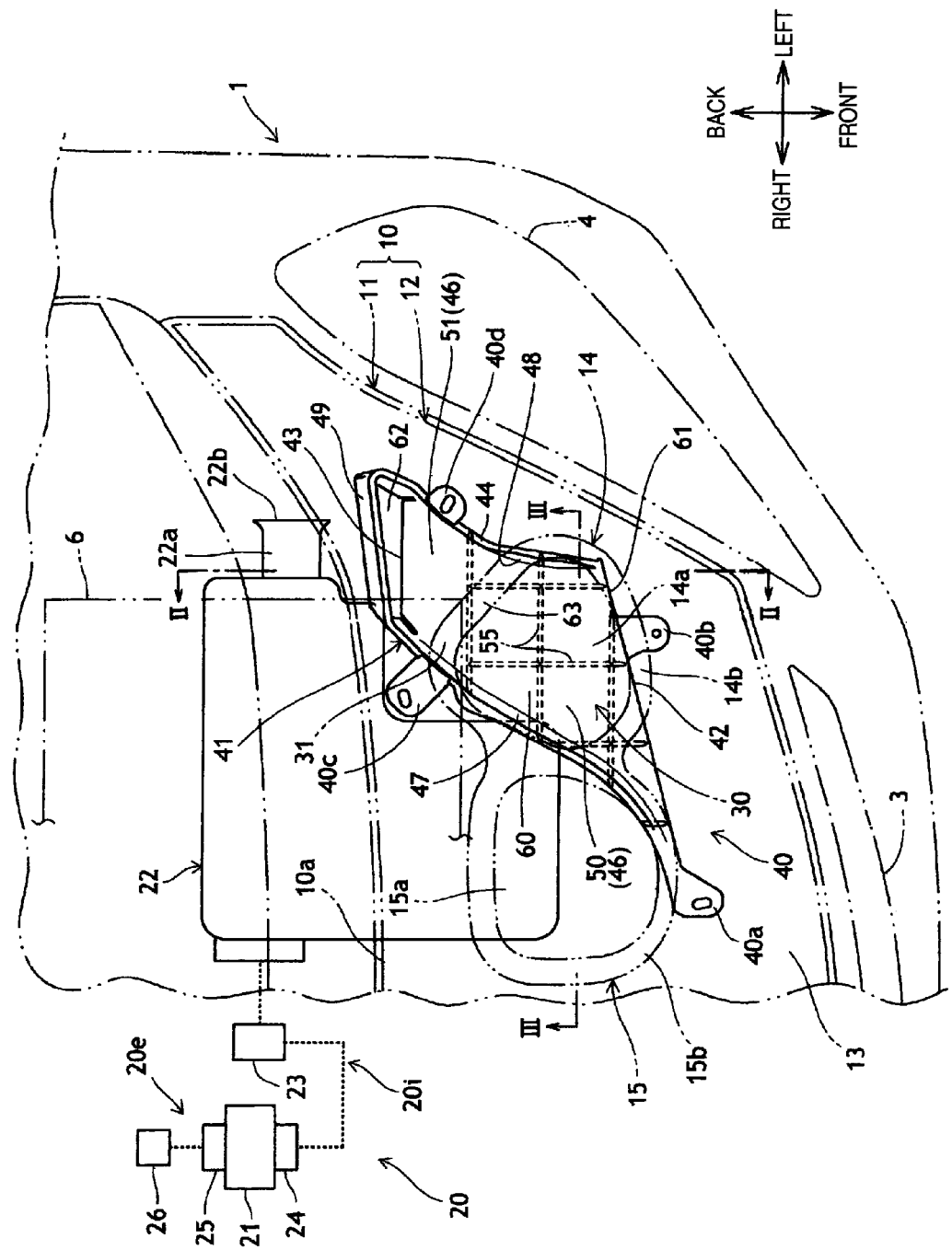
FIG. 1 is a plan view of a main part in the vicinity of a front body of an automotive vehicle to which the invention is applied, which exemplarily shows an internal combustion engine, excluding an air cleaner, which is disposed slightly further rightwards within an engine compartment.
Figure 2:
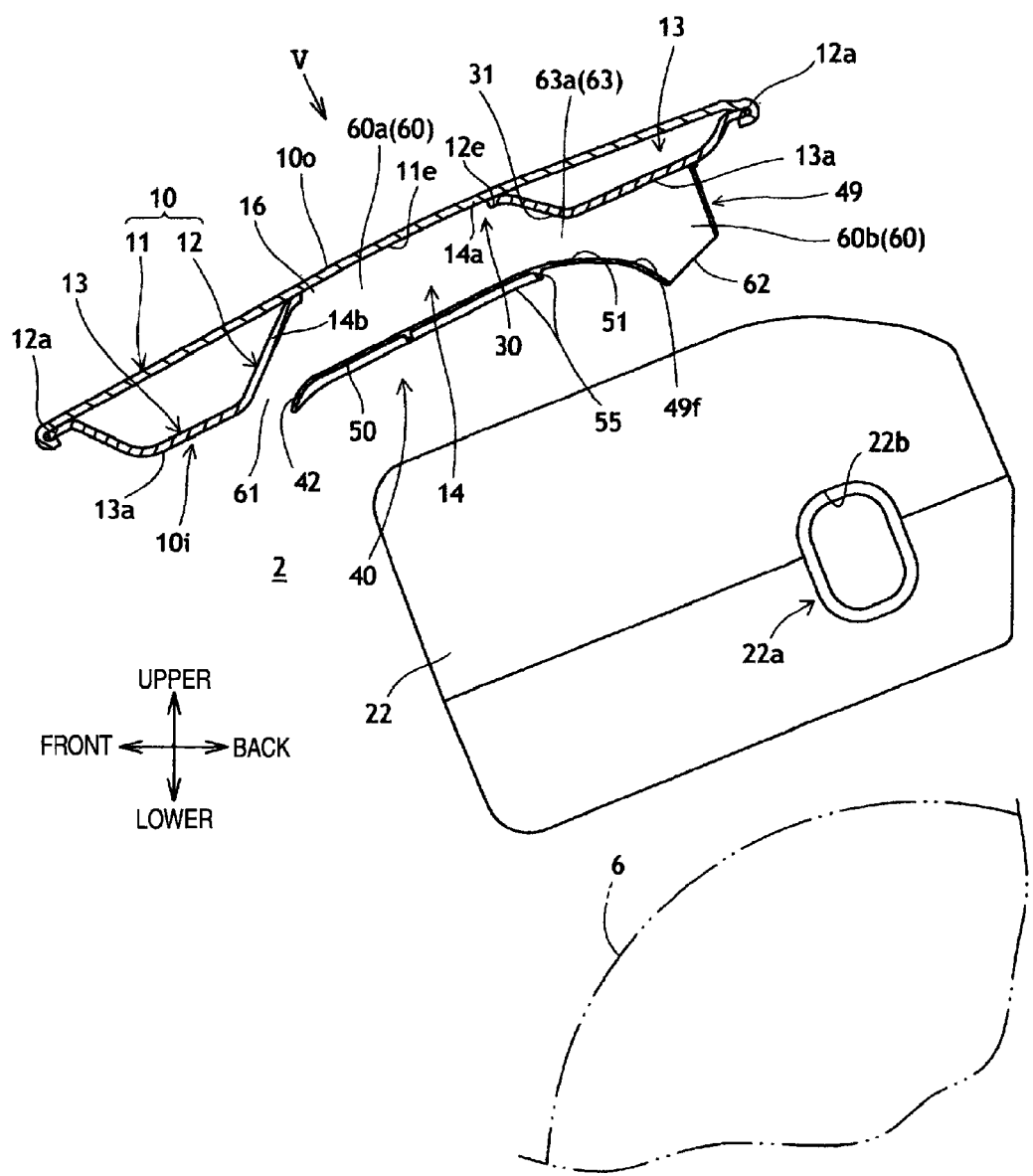
FIG. 2 is a sectional view of the main part taken along the line II-II in FIG. 1.
Figure 3:
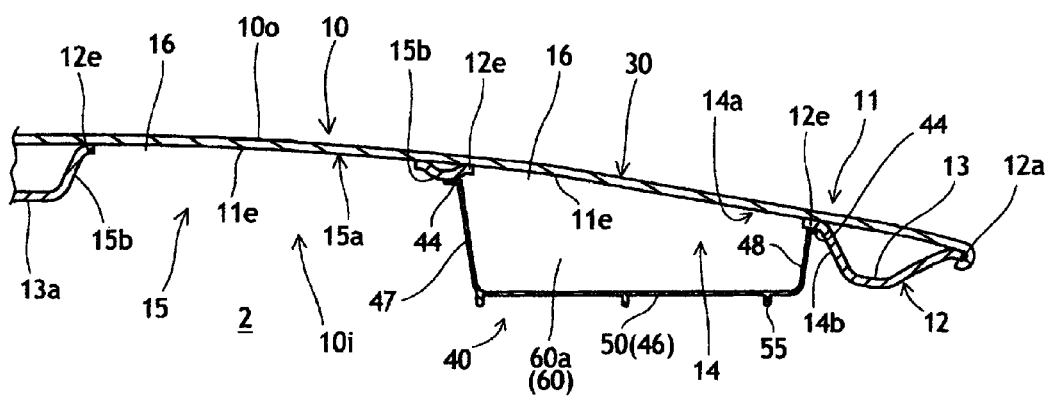
FIG. 3 is a sectional view of the main part taken along the line in FIG. 1.
Figure 4:
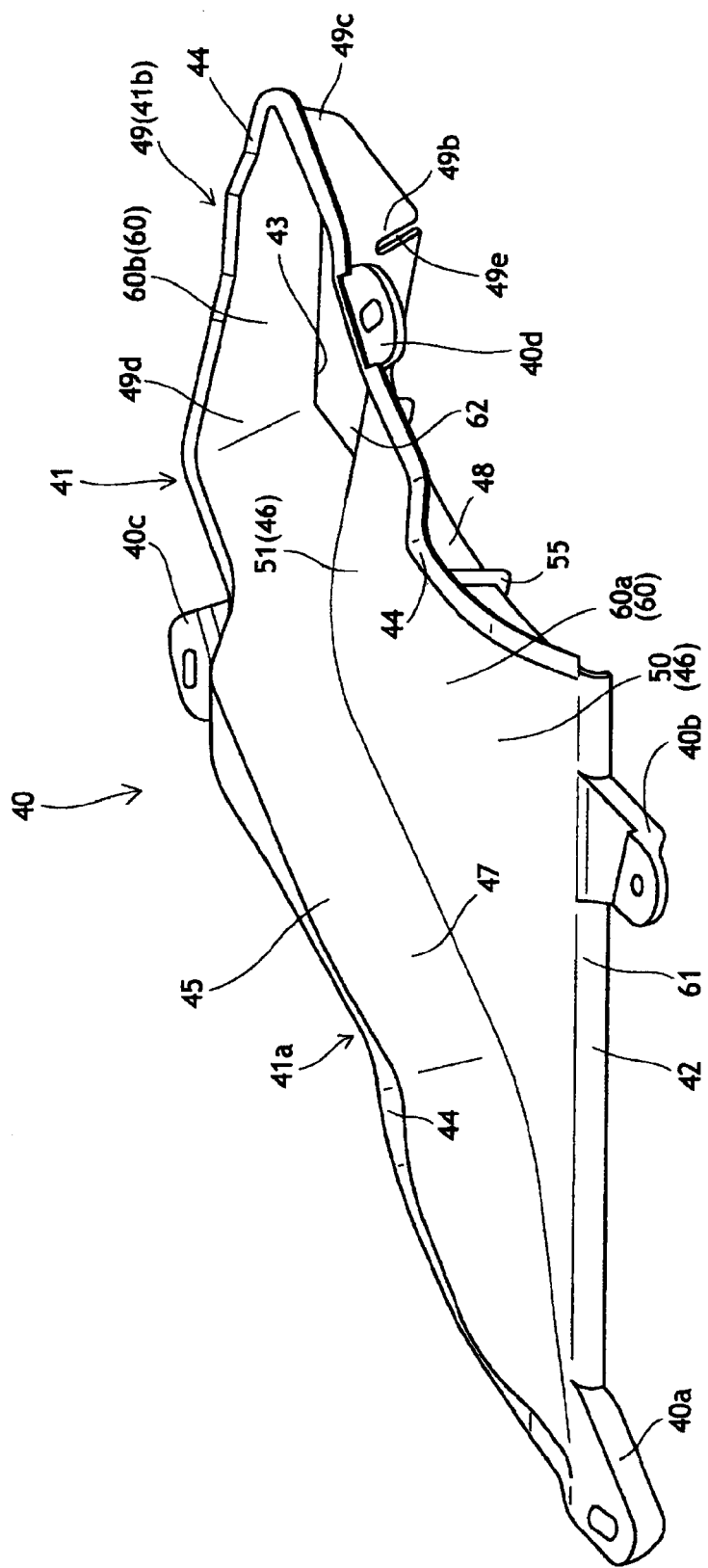
FIG. 4 is a perspective view of an air duct which is provided on the automotive vehicle in FIG. 1.
Figure 5:
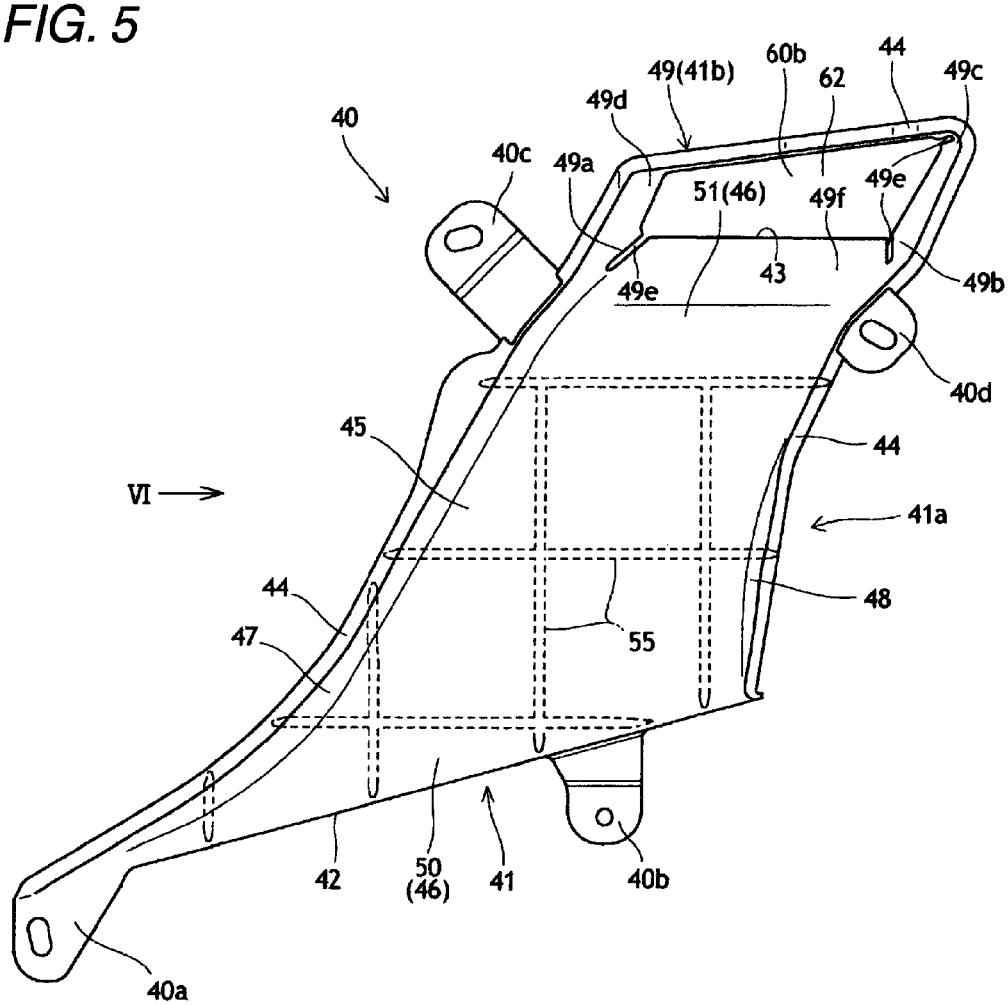
FIG. 5 is a diagram of the air duct as viewed in a direction indicated by an arrow V in FIG. 2.
Figure 6:
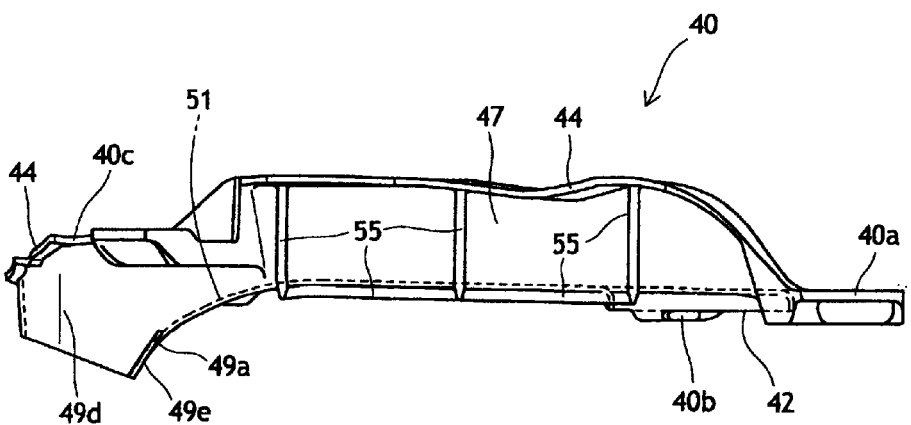
FIG. 6 is a diagram as viewed in a direction indicated by an arrow VI in FIG. 5.

Referring to FIGS. 1 to 3, an automotive vehicle to which the invention is applied includes an internal combustion engine 20 as an engine which is disposed within an engine compartment 2 formed by a front body 1 which is a front part of a body, a bonnet 10 as a hood member which is provided on the front body 1 so as to be opened and closed so as to cover the engine compartment 2 from thereabove, and an air duct 40 as a passage forming component for forming an air passage for guiding air that has flowed from a front grille into the engine compartment 2 to an induction system 20i of the internal combustion engine 20.

In the engine compartment 2, a transmission 6, which makes up part of a power transmission system or power train and which is connected to an engine main body 21 for transmitting power generated by the internal combustion engine 20 to front road wheels which is driving road wheels, is disposed leftwards of the engine main body 21.

The front body 1 includes a frame construction (not shown) which supports thereon the internal combustion engine 20 and the transmission 6, the front grille 3 which is an introducing portion of outside air into the engine compartment 2, and headlamps 4.

The bonnet 10 is mounted on the front body 1 so as to rotate in up and down directions about hinges (not shown) which connect rear end portions of a left edge portion and a right edge portion thereof to the front body 1.

Note that in following explanation of the embodiment, the up and down directions mention vertical directions, and front and rear and left and right, respectively, means front and rear and left and right of the automotive vehicle. In addition, left and right directions are also vehicle width directions, and when one of a leftward direction and a rightward direction is one of the left and right directions, the other of the leftward direction and the rightward direction is the other of the left and right directions. In addition, upstream and downstream are used in relation to the flow of air within an air guide passage 60.

The internal combustion engine 20 is a multi-cylinder, four-stroke internal combustion engine. The internal combustion engine 20 includes the engine main body 21 which is made up of a cylinder block having cylinders in which pistons fit which are driven by virtue of pressure resulting from combustion gas generated as a result of combustion of a mixture of air and fuel in combustion chambers and a cylinder head connected to the cylinder block and having provided therein inlet ports and exhaust ports which communicate with the combustion chambers, the induction system 20 which guides air taken into the internal combustion engine 20 to the combustion chambers, and an exhaust system 20e which guides exhaust combustion gases from the combustion chambers to the outside of the internal combustion engine 20 as exhaust gas. The pistons are connected to a crankshaft which is supported rotatably on the engine main body 21 and whose rotating center line is directed in the left and right direction, and the pistons which are driven to reciprocate by combustion gases within the cylinders drive and rotate the crankshaft, the rotation of the crankshaft being transmitted to the front road wheels while being changed in velocity by the transmission 6.

The induction system 20i includes an air cleaner 22 having an air inlet duct 22a which forms an air inlet port 22b from which air is let into the engine compartment 2, a throttle valve device 23 which includes a throttle valve for controlling the flow velocity of air which has passed through the air cleaner 22 and has been cleaned, and an induction manifold 24 for dividing the air that has passed through the throttle valve device 23 to guide the divided air to the inlet ports which correspond, respectively, to the combustion chambers. The induction manifold 24, which is an induction pipe device, is disposed on a front side of the engine main body 21 and is then attached to the cylinder head.

The exhaust system 20e includes an exhaust manifold 25 for collecting exhaust gases which have passed through the exhaust ports to be discharged from the combustion chambers, an exhaust pipe 26 which guides the exhaust gases which have passed through the exhaust manifold 25 to the outside of the internal combustion engine 20, and an emission control device and a muffler (both of which are not shown).

The exhaust manifold 25 is disposed on a rear side of the engine main body 21 and is attached to the cylinder head.

The bonnet 10 includes an outer panel 11 which constitutes an outer surface 10o of the bonnet 10 and an inner panel 12 which is provided on an inside (that is, an engine compartment 2 side) of the outer panel 11 so as to be connected to the outer panel 11. The metallic inner panel 12 is connected to the metallic outer panel 11 through plastic deformation work such as hemming work of connecting a circumferential edge portion 12a thereof to the outer panel 11 and with a connecting means such as an adhesive for connecting other portions of the inner panel 12 than the outer circumferential edge portion 12a which scatter thereon to the outer panel 11.

An inner surface 10i (that is, a portion of the bonnet 10 which faces the engine compartment 2) of the bonnet 10 is formed by the inner panel 12 and the outer panel 11 and the inner surface 10i has an irregular construction which imparts rigidity to the bonnet 10. The irregular construction, which is formed through cooperation between the outer panel 11 and the inner panel 12 which has a rising portion 13 which is formed by bending work, is made up of the rising portion 13, which is formed by the inner panel 12 so as to rise from the circumferential edge portion 12a so as to form space between the outer panel 11 and itself, and a plurality of recessed portions which are recessed from the rising portion 13 towards the outer surface 10o. In FIG. 1, in the plurality of recessed portions, two recessed portions 14, 15 are shown.

The respective recessed portions 14, 15 are made up of bottom portions 14a, 15a which follow the shape of the outer panel 11 and circumferential portions 14b, 15b which extend from the full circumference of the bottom portions 14a, 15a towards a top surface 13a of the rising portion 13 and which are separated from the outer panel 11. The bottom portions 14a, 15a which are surrounded, respectively, by the circumferential portions 14b, 15b are each made up of an exposed portion 11e of the outer panel 11 which is exposed to the engine compartment 2 through a through hole 16 which is provided on the inner panel 12 and a circumferential edge portion 12e of the inner panel 12 which specifies the through hole 16. The circumferential edge portion 12e is a portion which is in abutment with the outer panel 11 or a portion which is connected thereto. In addition, the respective circumferential portions 14b, 15b are portions which are inclined from the bottom portions 14a, 15a towards the top surface 13a or portions which lie closer to the bottom portions 14a, 15a than the top surface 13a.

Note that in the event that no through hole 16 is formed, the recessed portions 14, 15 may be formed only by the inner panel 12.

Referring to FIGS. 1 to 6, the air duct 40, which is provided integrally on the inner surface 10i of the bonnet 10, forms an air guide passage 60 between a bonnet portion 30 as a hood portion which constitutes part of the bonnet 10 and itself using the bonnet portion 30 as a passage wall of the air guide passage 60. The bonnet portion 30 has one or more recessed portions like the recessed portions, and in this embodiment, the bonnet portion 30 is made up of both the recessed portions 14, 15 and the rising portion 13.

Therefore, the passage wall of the air guide passage 60 is made up of the bonnet portion 30 and the air duct 40.

In addition, the air duct 40 is made through integral molding from an elastomer which is material having rubber-like elasticity, for example, a soft synthetic resin. In addition, the outer panel 11 and the inner panel 12 are made from a material which has a larger elastic coefficient or a larger strength than those of the material from which the air duct 40 is made. In addition, a material which has a superior heat resistance is used as the material for forming the air duct 40 in order to suppress the increase in temperature of air within the air guide passage 60.

The air duct 40, which is detachably attached to the bonnet 10 with clips (not shown) as fixing means, has a passage portion 41 which forms the air guide passage 60 and one or more attachment portions, in this embodiment, four attachment portions 40a to 40d, where the air duct 40 is attached to the rising portion 13. Holes through which the clips are passed are provided, respectively, in the attachment portions 40a to 40d.

The passage portion 41 having a substantially constant thickness has an inlet port edge portion 42 which forms an inlet port 61 to the air guide passage 60 in cooperation with the bonnet portion 30, an outlet port edge portion 43 which forms an outlet port 62 from the air guide passage 60 and an edge portion 44 having an abutment surface which is brought into abutment with the bonnet portion 30.

As shown in FIGS. 1 to 3, the air duct 40 is disposed in the engine compartment 2 in such a manner that the passage portion 41 is situated apart leftwards from the engine main body 21 in the left and right direction and lies above the transmission 6. In addition, as viewed from the top, part of the air cleaner 22 and part of the passage portion 41 overlap the transmission 6.

The inlet port 61 which is situated at a front end portion of the air guide passage 60 (or the passage portion 41) lies in the same position as part of the front grille 3 in the left and right direction, and the outlet port 62 which is situated at a rear end portion of the air guide passage 60 (or the passage portion 41)

lies in the same position as the air inlet port 22b in the left and right direction and in substantially the same position as a rear end portion 10a of a central portion in the left and right direction of the bonnet 10 in the front and rear direction. Because of this, the air inlet port 22b lies, in the left and right direction, within a range in the left and right direction where the outlet port 62 is formed.

In addition, the passage portion 41 lies in the same position as a left portion of the air cleaner 22 in the left and right direction and lies in the same position as a front portion of the air cleaner 22 in the front and rear direction. Furthermore, the whole of the passage portion 41 or the whole of the air duct 40 is disposed within the range of the headlamp 4 as viewed in the front and rear direction.

Referring to FIGS. 1 to 6, the edge portion 44 forms an opening 45 along the air guide passage 60. The opening 45 is covered with the bonnet portion 30 from thereabove in such a state that the air duct 40 is attached to the inner panel 12 (hereinafter, referred to as an "attached state"). Therefore, the air duct 40 is a component which has an open section whose cross section (that is, a cross section of the passage) is opened at the inlet port 61 and the opening 45 in the range where the inlet port edge portion 42 and the edge portion 44 are formed.

The passage portion 41 is made up of an open sectional portion 41 having the open section and a closed sectional portion 41b having a closed section whose cross section is not opened. In addition, the air guide passage 60 is made up of an upstream side passage 60a which is formed by the open sectional portion 41a and the bonnet portion 30 and a downstream side passage 60b which is formed only by the closed sectional portion 41b.

The open sectional portion 41a has a bottom wall 46 which opposes to the bonnet portion 30 across the air guide passage 60 in the up and down direction, and a pair of side walls 47, 48 which rise from the bottom wall 46. Because of this, a cross section of the open sectional portion exhibits a U-shape. The pair of side walls 47, 48 oppose to each other across the air guide passage in the left and right direction.

The respective side walls 47, 48 and the edge portion 44 which constitutes an upper end of a flow-out portion 49, which will be described later, have a flange shape and are brought into abutment with the bonnet portion 30 while being deformed elastically so as to reduce the leakage of air flowing through the air guide passage 60 from a gap between the air duct 40 and the bonnet portion 30 or, preferably, to produce a substantially airtight state between the air duct 40 and the bonnet portion 30. Because of this, the edge portion 44 also constitutes a seal portion of the air duct 40.

The inlet port edge portion 42 is formed into a funnel shape•which is curved downwards smoothly as it extends forwards and defines the inlet port 61 between itself and the bonnet portion 30 including the bottom portion 14a and the circumferential portions 14b, 15b (refer to FIG. 2).

Both the side walls 47, 48 deflect the flow of air which has flowed into the upstream side passage 60a from the inlet port 61 leftwards in the left and right direction so as to direct it towards the outlet port 62 and the air inlet port 22b.

The closed sectional portion 41b having the outlet edge portion 43 constitutes the flow-out portion 49 which discharges downwards the air from the upstream side passage 60a so as to direct it towards the air inlet port 22b. The flow-out portion 49, which constitutes a portion of the air duct 40 which is more rigid than the open sectional portion 41a due to the portion having the closed section, defines the outlet port 62 which has a substantially quadrangular shape and the downstream side passage 60b. The outlet port 62 is situated in a position which opposes to the rising portion 13 which constitutes part of the bonnet portion 30 across the air guide passage portion 60 in the up and down direction (refer to FIG. 2).

In addition, in four corner portions 49a to 49d of the flow-out portion 49 whose passage area is reduced as it extends downstream to approach the outlet port 62, slits 49e are formed in the three corner portions 49a to 49c so as to facilitate the collapse of the flow-out portion 49 in the front and rear direction when such a large load as to deform the air duct 40 largely is exerted on the air duct 40 from the front. In this way, by forming no slit 49e in part of the corner portions 49a to 49d, that is, the corner portion 49d, the rigidity of the closed sectional portion 41b (or the flow-out portion 49) can easily be ensured while realizing a reduction in weight of the air duct 40, whereby the vibration of the closed sectional portion 41b is suppressed which is caused by a change in air pressure within the air guide passage 60 which is attributed to pulsation in induction air which is transmitted from the air inlet port 22b, and noise that is generated based on the vibration is suppressed.

The rigidity of the inlet port end portion 42 is increased by the pair of attachment portions 40a, 40b which project forwards from the inlet port end portion 42. Therefore, vibration transmitted through the front body 1 and the vibration of the inlet port edge portion 42 and furthermore the open sectional portion 41a due to the change in air pressure within the air guide passage 60 are suppressed, and thus the noise is suppressed.

The pair of attachment portions 40c, 40d, which are positioned closer to the flow-out portion 49 than the pair of attachment portions 40a, 40b in the front and rear direction, project, respectively, rightwards and leftwards from the pair of side walls 47, 48. Reinforcement ribs 55 are provided on an outer surface of the bottom wall 46 so as to extend in the front and rear direction and the left and right direction into a grid-like shape, and the reinforcement ribs 55 are also provided on respective outer surfaces of the side walls 47, 48 so as to extend in the up and down direction.

The air duct 40 is disposed partially within the recessed portions 14, 15 at the open sectional portion 41a which constitutes part thereof. The height of the respective side walls 47, 48 are proportional to the depth of the recessed portions 14, 15. Because of this, a portion of the side wall 47 or the side wall 48 which has the edge portion 44 abutting with the bottom portion 14a or the bottom portion 15a is made taller than a portion having the edge portion 44 abutting with the circumferential portion 14b or the circumferential portion 15b. Therefore, since the recessed portions 14, 15 of the bonnet portion 30 constitute the passage wall of the upstream side passage 60a, part of the air guide passage 60 constitutes space defined by the recessed portions 14, 15, and consequently, the air guide passage 60 is formed by making use of the space so defined.

In addition, the bottom wall 46 of the open sectional portion 41a has a curved portion which is positioned in a portion lying near the flow-out portion 49 and is curved downwards in a direction in which it approaches the air inlet port 22b as the bottom wall 46 extends downstream to approach the outlet port 62 and a flat portion 50 formed into a substantially flat plane and extending from the inlet port edge portion 42 to the curved portion 51. A downstream portion of the curved portion 51 continues smoothly to a curved portion 49f of the flow-out portion 49.

On the other hand, a portion of the circumferential portion 14b constituting the bonnet portion 30 which lies further downstream than the bottom portion 15a and closer to the outlet port 62 constitutes a deflecting portion 31 which deflects downwards the flow of air within the upstream side passage 60a so as to direct it towards the outlet port 62 and the air inlet port 22b. The deflecting portion 31 is a rising portion which rises smoothly so as to approach gradually the bottom wall 46 including the curved portion 51 in the up and down direction as it extends downstream further.

In addition, the upstream side passage 60a has a velocity increasing portion (refer to FIGS. 1 and 2) which is defined between the deflecting portion 31 and the bottom wall portion 46 while being held therebetween. The velocity increasing portion 63, which lies between the inlet port 61 and the outlet port 62, crosses the upstream side passage 60a in the left and right direction and extends over the full width of the upstream side passage 60a and a whole area spanning in the left and right direction between both the side walls 47, 48. In addition, the area of the velocity increasing portion 63 is reduced gradually as it is directed downstream further, whereby the flow velocity of air is increased. In particular, since the flow velocity of air which is deflected by the deflecting portion 31 so as to be directed to flow along the curved portion 51 towards the outlet port 61 and the air inlet port 22 is increased in a portion 63a (refer to FIG. 2) which is defined by the deflecting portion 31 and the curved portion 51 in the velocity increasing portion 63, air flowing out of the outlet port 62 can be guided to the air inlet port 22b with good efficiency. In addition, since the portion 63a is a downstream most end portion of the velocity increasing portion 63 which lies nearest the outlet port 62, air whose flow velocity is increased in the portion 63a can be guided to the air inlet port 22 with better efficiency.

Then, when the internal combustion engine 20 is operated, since air inside the engine compartment 2 is taken into the internal combustion engine 20 from the air inlet port 22b so as to reduce the air pressure inside the engine compartment 2, outside air, which is air lying outside the engine compartment 2, is allowed to flow into the engine compartment 2 through the front grille 3 and between the bonnet 10 and the front body 1.

Air that has flowed into the engine compartment 2 flows into the air guide passage 60 from the inlet port 61, flows through the air guide passage 60 and flows out from the outlet port 62 towards the air inlet port 22b. As this occurs, while the automotive vehicle is running, running air which flows into the engine compartment 2 from the front grille 3 flows into the air guide passage 60 from the inlet port 61.

Air inside the air guide passage 60 is increased in flow velocity by the velocity increasing portion 63 and the tapered flow-out portion 49 at the outlet port 62. Then, air having a high directionality towards the air inlet port 22b flows out from the outlet port 62 towards the air inlet port 22b and is then taken into the combustion chambers through the induction system 20i.

Next, the function and advantage of the above described embodiment will be described.

In the automotive vehicle in which the air duct 40 which forms the engine air guide passage 60 for guiding air that has flowed into the engine compartment 2 to the induction system 20i is attached integrally to the inner surface 10i of the bonnet 10, the air duct 40 forms the air guide passage 60 between itself and the bonnet portion 30 which constitutes part of the bonnet 10 using the bonnet portion 30 as the passage wall of the air guide passage 60. By this configuration, since the bonnet 10 constitutes the passage wall which forms the air guide passage 60 together with the air duct 40, the air guide passage 60 is formed by the cooperation between the air duct 40 and the bonnet 10. As a result of this, compared with the case where the air guide passage 60 is formed solely by the air duct, the air duct 40 is made smaller in size and lighter in weight by such an extent that the part of the passage wall of the air guide passage 60 is constituted by the bonnet 10, and furthermore, since the air duct 40 can be disposed so as to be closer to the bonnet, the air duct 40 which is provided integrally on the bonnet 10 can be disposed in a compact fashion within the engine compartment 2.

Since the space defined by the recessed portions 14, 15 of the irregular construction provided on the inner surface 10i of the bonnet 10 in order to increase the rigidity of the bonnet 10 by the bonnet portion 30 having the recessed portions 14, 15 which are provided on the inner surface 10i of the bonnet so as to be recessed towards the outer surface 10o of the bonnet 10, the required passage area of the air guide passage 60 can be ensured while making the air duct 40 smaller in size by such an extent that the space constitutes part of the air guide passage 60. As a result of this, by making use of the recessed portions 14, 15 which are provided on the bonnet 10, the air duct 40 can be made smaller in size and lighter in weight, and the disposition of the air duct 40 can be made compact.

In the air duct 40, the edge portion 40 which is attached to the bonnet 10 and is brought into abutment with the bonnet portion 30 forms the opening 45 along the air guide passage 60, and part of the air duct 40 is disposed within the recessed portion. Therefore, since the air duct 40 having the opening 45 along the air guide passage 60 or the so-called open section is used as the duct forming the air guide passage 60, the setting of a flow direction of air within the air guide passage 60 to make the air approach the air inlet port 22b is facilitated, thereby increasing the degree of freedom in disposing the air duct 40 which forms the air guide passage 60 in cooperation with the recessed portions 14, 15 of the bonnet. Moreover, since the air duct 40 is disposed in the recessed portions 14, 15, the reduction in size and weight of the air duct 40 which is attached integrally to the bonnet 10 and the compact disposition of the air duct 40 within the engine compartment 2 can be realized.

In the air duct 40, the outlet port 62 of the air guide passage 60 is formed in the position which opposes to the bonnet portion 30 across the air guide passage 60, and the bonnet portion 30 has the deflecting portion 31 which deflects the flow of air within the air guide passage 60 towards the outlet port 62. Therefore, since the deflection portion 31 which constitutes the portion against which the air deflected towards the outlet port 62 collides within the air guide passage 60 is made up of the bonnet portion 30 which is part of the bonnet 10 which is highly rigid, vibration which is generated by the change in air pressure within the air guide passage 60 which is attributed to pulsation of air induced into the induction system 20i can be reduced without increasing the rigidity of the air duct 40. As a result, since the deflecting portion 31 for deflecting the flow of air is configured by making use of the bonnet 10, the vibration of the air duct 40 can be suppressed, and the air duct 40 can be made lighter in weight.

The air duct 40 has the curved portion 51 which is curved in the direction in which it approaches the air inlet port 22b of the air induction system 20i as the curved portion 51 extends downstream further, the bonnet portion 30 has the deflecting portion 30 which is the rising portion rising towards the curved portion 51 as it extends downstream further, the air guide passage 60 has the velocity increasing portion 63 formed by being held between the curved portion 51 and the deflecting portion 31, and the area of the air guide passage 60 is reduced in the velocity increasing portion 63 as it extends downstream further. Therefore, since the flow velocity of air is increased along the curved portion 51 curved in the direction in which it approaches the air inlet port 22b of the air induction system 20i by the deflecting portion 31 which rising towards the curved portion 51 as it extends downstream further in the portion 63a of the velocity increasing portion 63 formed by the curved portion 51 and the deflecting portion 31, the efficiency with which the air is guided to the induction system 20i by the air guide passage 60 is increased.

Since the leakage of air from the air guide passage 60 is reduced by the edge portion 44 of the air duct 40 which is made from elastomer doubling as the seal between the air duct 40 and the bonnet portion 30, no separate seal member needs to be provided between the air duct 40 and the bonnet portion 30, this contributing to a reduction in production costs.

Hereinafter, in relation to a form in which part of the embodiment that has been described heretofore is modified, a modified configuration will be described.

A passage forming component may be a duct having a cross-sectional shape other than the U-shape or may be a flat plate-like member.

A passage forming component may be molded integrally with the bonnet 10 or the inner panel 12 so as to be provided integrally on the bonnet 10.

While in the embodiment, the hood member is the bonnet 10, a hood member may be adopted which covers the engine from other directions than from above.

A seal member which is separate from the bonnet portion 30 and the air duct 40 may be disposed between them, and as this occurs, the seal member so disposed constitutes part of the bonnet portion 30 or part of the edge portion 44 of the air duct 40.

Note that the present patent application is based on Japanese Patent Application (Application No. 2007-208219) filed on Aug. 9, 2007 and the contents thereof are to be incorporated herein in its entirety by reference.

The invention claimed is:

1. An automotive vehicle comprising:
an engine disposed within an engine compartment covered with a bonnet,
a passage forming component provided integrally on an inner surface of the bonnet,
wherein the passage forming component forms an engine air guide passage which guides air flowing into the engine compartment to an induction system of the engine,
an air inlet port of the inductions system disposed on a portion separate from the passage forming component,
the passage forming component forms the air guide passage between a bonnet portion, which constitutes part of the bonnet, and the passage forming component, the bonnet portion defining a passage wall of the air guide passage, the passage forming component has a curved portion which is curved in a direction in which the passage forming component approaches the air inlet port of the induction system as the passage forming component extends towards a downstream side,
the bonnet portion having a rising portion which rises towards the curved portion,
the air guide passage has a velocity increasing portion which is formed so as to be held between the curved portion and the rising portion, and
an area of the air guide passage at the velocity increasing portion is reduced to increase the velocity of air which is deflected by the rising portion to flow along the curved portion.

2. The automotive vehicle as set forth in claim 1, wherein the bonnet portion has a recessed portion provided on the inner surface of the bonnet and which is recessed towards an outer surface of the bonnet.

3. The automotive vehicle as set forth in claim 2, wherein the passage forming component is an air duct which is attached to the bonnet and of which an edge portion abutting the bonnet portion forms an opening along the air guide passage, and the air duct is disposed within the recessed portion.

4. The automotive vehicle as set forth in claim 1, wherein the passage forming component forms an outlet port of the air guide passage in a position which opposes the bonnet portion across the air guide passage, and the bonnet portion deflects a flow of the air within the air guide passage towards the outlet port.

5. The automotive vehicle as set forth in claim 4, wherein the outlet port has a plurality of corner portions.

6. The automotive vehicle as set forth in claim 5, wherein at least one of the corner portions is formed with a slit therein.

7. The automotive vehicle as set forth in claim 5, wherein at least one of the corner portions is free of having a slit formed therein.

* * * * *